United States Patent Office.

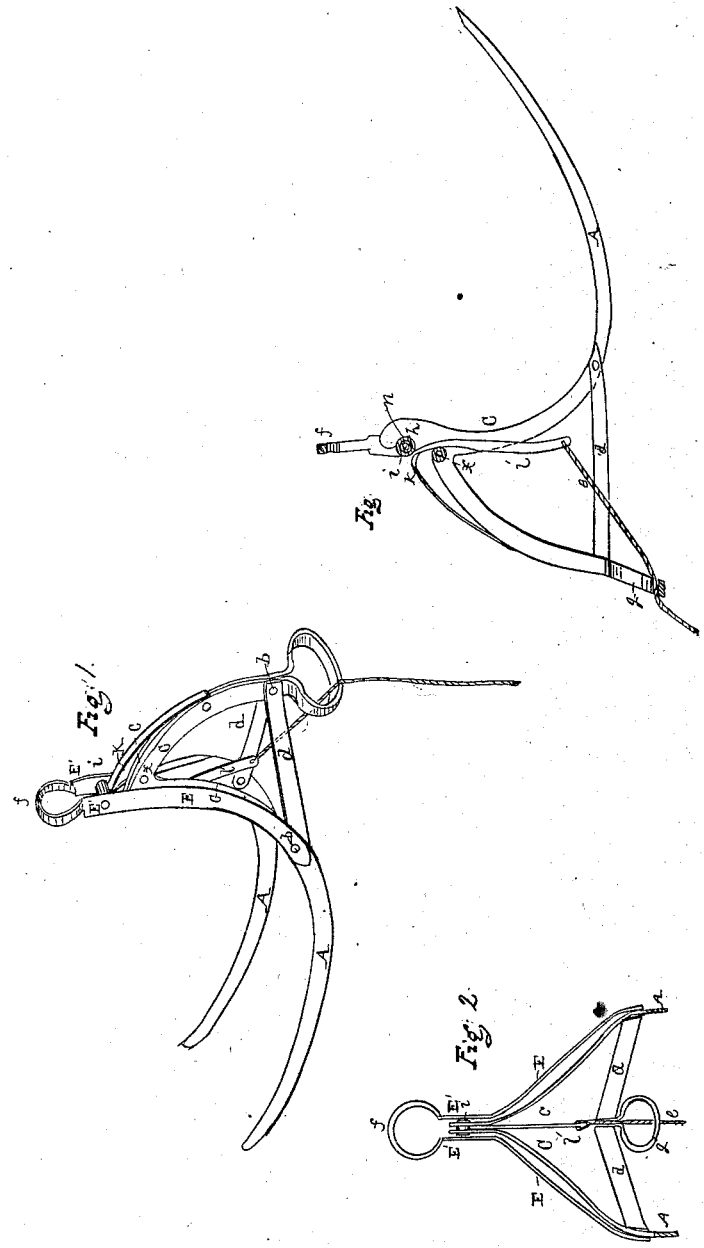

NELSON PALMER, OF ALBANY, NEW YORK.

Letters Patent No. 77,907, dated May 12, 1868.

IMPROVEMENT IN HORSE HAY-FORKS.

*The Schedule referred to in these Letters Patent and making part of the same.*

TO ALL WHOM IT MAY CONCERN:

Be it known that I, NELSON PALMER, of Albany, in the county of Albany, and State of New York, have invented new and useful Improvements in Horse Hay-Forks; and I do hereby declare that the following is a full and complete description of the construction and operation of the same, reference being had to the accompanying drawings, making part of this specification, in which—

Figure 1 is a perspective view, and

Figures 2 and 3 are sectional views.

Like letters refer to like parts in the several views.

The tines A A are slightly curved, and parallel from the points backward to the bolts $b$ $b$, from which points the prolongations of the tines A A become braces $c$ $c$, which converge near each other at the top, and are connected with the opposite sides of the handle $h$ respectively by welding. Passing above the arc of a circle described by the handle $h$, they become the elevated points of rest for the bail $e$. The handle $h$, from the point of contact with the braces $c$ $c$, forms the arc of a circle equal in length to the radius of said circle, having the bolt $b$, at the lower extremity of the brace $c$, as its centre.

From the top, the handle $h$ is parted a sufficient length to allow the proper action of the catch $k$. At a point near the lower end of the handle $h$ are bolted braces $d$ $d$, which extend forward and diverge, so that they severally come in contact with the braces $c$ $c$, at or near their junction with the base of the tines A A, and are fastened, by the bolts $b$ $b$, firmly together at those points.

At or near the same points on the outside is hinged the bail $e$, the sides of which, curving in conformity with the braces $c$ $c$, converge at the top of the handle $h$, and extend upward, parallel to each other, a sufficient distance apart to allow the handle $h$ to move freely between them. The height of the bail $e$ is equal to the length of the tines A A. Between the parallel sides $e'$ of the bail is placed a roller, $i$, at such a point near the handle $h$ as to allow the bail $e$ to move freely along the handle $h$ without the roller $i$ coming in contact with it, except at the top. There it is made to fit into a concavity in the back edges of the elevated points $n$, the front edges being convex or rounded. At a point below the opening in the handle $h$ is riveted to it the catch $k$, which extends upward along the handle $h$ until it reaches the roller $i$, when the bail is upright, or in position for elevating the fork.

At that point, forming an angle, it passes down through the opening in the handle $h$, and forms a lever, $l'$, for operating the catch $k$. Behind the catch $k$, between the open parallel sides of the handle $h$, is placed a roller, $x$, against which the catch $k$ rests. When the bail $e$ is passing into position, the roller $i$, coming in contact with the catch $k$, forces it down upon or near the handle $h$, until the bail $e$, having reached its extreme elevation, the catch $k$ springs up behind the roller $i$, and holds the bail $e$ in an upright and the tines A A in a horizontal position. When the fork is elevating its load of hay or other substance, the catch $k$ is firmly supported by its fastening to the handle $h$, and its pressure against the roller $x$. When such load is to be discharged, the tension of the cord $l$, attached to the lower extremity of the lever $l'$, depresses the catch $k$, and the bail, being released, moves freely along the handle $h$, allows the tines A A to approach the perpendicular and discharge their burden.

In the top of the bail $e$ is a loop, $f$, to which the power is applied, and the loop $g$ in the lower end of the handle is for convenience in operating the fork.

This fork is made with two tines A A. It may be made with three or four tines; with three, by inserting one between these two, by making the curve the same, and dividing the prolongation, at a convenient point above the bolt $b'$, into braces $c'$ $c'$, and bolting them to the braces $c$ $c$, or by extending the prolongation of said tine back to the handle $h$, as a brace, $d'$, and bolting-braces $c'$ $c'$ to the base of the tine, and to the braces $c$ $c$. It may be made with four tines, by extending the outside tines A A back, and bolting them to the handle $h$ as the braces $d$ $d$, and dividing the bail $e$ below the handle $h$ into four parts, attaching the lower extremity of one part to each of the tines A A $a$ $a$ by the bolts $b$ $b$ $b'$ $b'$; or by extending the inside tines $a$ $a$ back, and bolting them to the handle $h$, and extending braces $c'$ $c'$ from said tines to the braces $c$ $c$; or, again, by extending all the tines back, converging and bolting them to the handle $h$ as braces $d$ $d$ $d'$ $d'$, and uniting braces $c$ $c$ from the outside tines A A with the handle $h$ at the top, and the inside tines $a$ $a$ to the braces $c$ $c$, and bolting them together, so that the spaces between the tines A A $a$ $a$, from the bolts $b$ $b$ $b'$ $b'$ to the points, shall be equal to each other.

What I claim as my invention, and desire to secure by Letters Patent, is—

The spring-catch $k$, in combination with the bail $e$ and roller $i$, for the purpose of holding the bail $e$ in position, or releasing it, at pleasure.

In testimony whereof, I have signed my name to this specification in the presence of two subscribing witnesses.

NELSON PALMER.

Witnesses:
D. P. HOLLOWAY,
JAS. R. EDSON.